United States Patent [19]

Sakamoto

[11] 3,958,348
[45] May 25, 1976

[54] SLIDE FILING PLATE

[75] Inventor: Yoshichika Sakamoto, Ohmiya, Japan

[73] Assignee: Slidex Corporation, Tokyo, Japan

[22] Filed: Nov. 14, 1974

[21] Appl. No.: 523,799

[30] Foreign Application Priority Data
Nov. 28, 1973 Japan.............................. 48-133668

[52] U.S. Cl. ............................. 40/106.1; 40/158 R
[51] Int. Cl.² ........................................ G09F 13/10
[58] Field of Search .......... 40/106.1, 158 R, 158 B, 40/63 A, 64 A, 124.4; 353/120

[56] References Cited
UNITED STATES PATENTS

| | | | |
|---|---|---|---|
| 2,968,882 | 1/1961 | Ozeki | 40/106.1 |
| 3,044,198 | 7/1962 | Badalich | 40/64 A X |
| 3,543,426 | 12/1970 | Sakamoto | 40/158 B |

*Primary Examiner*—Louis G. Mancene
*Assistant Examiner*—John F. Pitrelli
*Attorney, Agent, or Firm*—Haseltine, Lake & Waters

[57] ABSTRACT

A slide filing plate having a plurality of pockets for holding a plurality of slides in a common plane, each pocket having a translucent or transparent membrane secured thereto in parallel to but spaced from the bottom of the pocket. The spacing from the membrane to the slide film is greater than the distance from the slide supporting wall of the pocket to the slide film, so that the slide can be projected as placed on the filing plate without being disturbed by the images of the veins and particles on the surface of the membrane.

6 Claims, 6 Drawing Figures

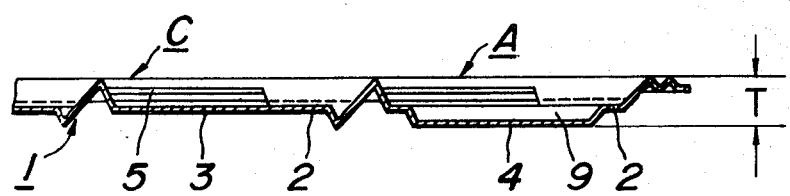
FIG_2
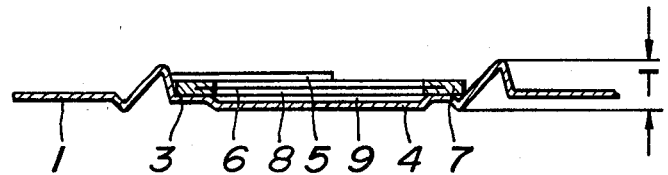
FIG_3

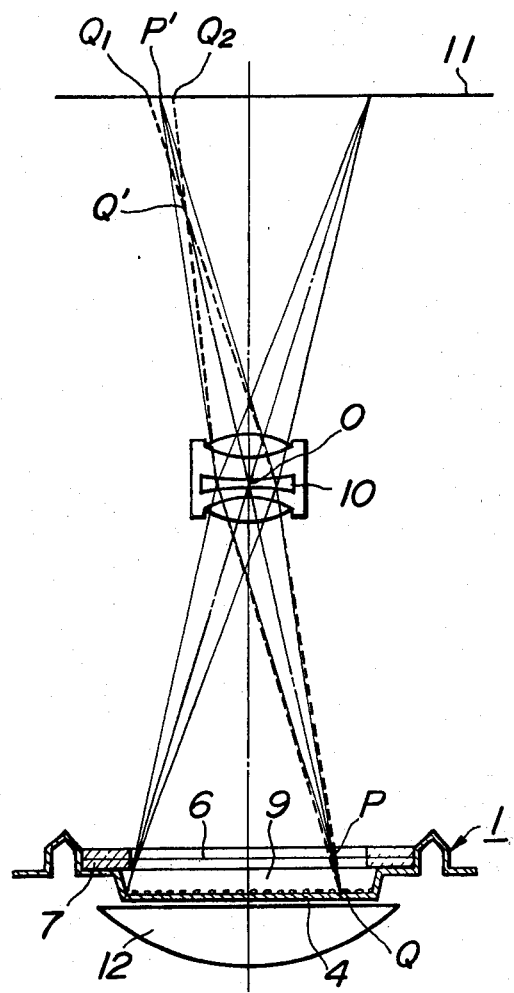
FIG_4

FIG_5
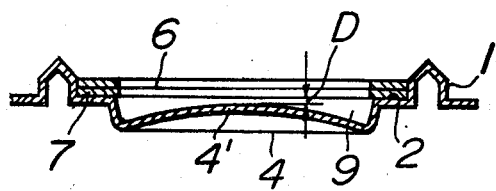
FIG_6
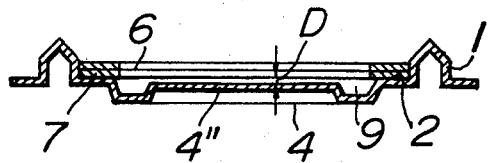

SLIDE FILING PLATE

BACKGROUND OF THE INVENTION

1. Field of the Invention

This invention relates to a slide filing plate, and more particularly to a slide filing plate having a translucent or transparent protective membrane, which membrane protects slide film carried by the filing plate in such a manner that the pictures of the slides can be projected without removing the slides from the filing plate and without being significantly disturbed by the presence of the membrane.

What is meant by the words "slide film" here refers to various kinds of films carrying pictures which are to be projected onto a screen by a suitable projector. Accordingly, the slide film includes conventional color slide film, microfilm, and other films which are used for storing informations.

2. Description of the Prior Art

A slide holding plate (to be referred to as "the slide filing plate", hereinafter) has been used for orderly holding or filing a plurality of mounted slide film in a common plane in such a manner that all the slide film can be viewed simultaneously. Such known slide filing plate is made by shaping cardboard or a plastic sheet material into a filing sheet having a plurality of pockets for receiving individual slides therein, respectively.

Some of the conventional slide filing plates have transparent diffusion membranes disposed at each of the slide-receiving pockets for protecting the emulsion surface of the slide film against mechanical contact with foreign matter and for facilitating the viewing of the picture of the slide film by diffused light through the diffusion membrane. Such slide filing plate with diffusion membranes is highly suitable for safe storage of slide film in an orderly fashion, but if one tries to project the picture of the slide film by a suitable projector, the slides must be removed from the filing plate one by one for placing it in the projector and then the slides must be returned to the filing plate again one by one upon completion of the projection. This removing and returning of the slides relative to the filing plate for the projecting operation is cumbersome.

To mitigate such difficulty, it has been proposed to eliminate the diffusion membranes from the pockets of the filing plate. If, however, the diffusion membranes are eliminated, the emulsion surfaces of the slide film are directly exposed to the outside air, so that the risk of damage by mechanical contact with foreign matter is increased, so that the general level of protection of the slide film is reduced. Furthermore, without the diffusion membrane, it becomes rather difficult to simultaneously view all the pictures of the slides carried by the filing plate.

When one tries to project the picture of a slide, which is carried by the filing plate with the diffusion membranes, in the state as placed on the filing plate, enlarged images of particles and veins on the diffusion membrane, intrinsic or extrinsic, are superposed on the desired image of the slide picture. Thus, the quality of the projected image of the slide picture becomes very poor, so that, in the case of filing plates with the diffusion membranes, it is not practical to project the slide pictures without removing the slides from the filing plate.

In short, there are two types of known slide filing plates, one type being suitable for safe storage of the slide films and the other type being suitable for projecting the slide pictures without removing them from the filing plate. However, there has not been any slide filing plate which simultaneously provides safe protection of slides for orderly storage and easy projection of slides by a projector without necessitating the removal of the individual slides from the filing plate.

Therefore, an object of the present invention is to mitigate the aforesaid difficulties of conventional slide filing plates by providing a novel slide filing plate.

SUMMARY OF THE INVENTION

According to the present invention, there is provided a slide filing plate comprising a substantially planar body, a plurality of slide-receiving pockets formed in the body and receiving one slide in each pocket, said pockets having bottom walls disposed in a common plane, so as to dispose film of the slides placed in the pockets in a common plane parallel to the plane of the bottoms of the pockets, and a plurality of membranes passing at least a part of incident light therethrough to a degree of not less than translucence, each of said membranes being secured to the bottom of the corresponding one of the pockets parallel to said common plane but with a spacing from the plane of the bottom wall, the spacing between the membrane and the film of the slide placed in the pocket being greater than the spacing between the slide-supporting portion of the pocket bottom wall and the last mentioned slide film.

BRIEF DESCRIPTION OF THE DRAWING

For a better understanding of the invention, reference is made to the accompanying drawing, in which:

FIG. 2 is a sectional view taken along the line II—II in FIG. 1;

FIG. 3 is an enlarged partial view of FIG. 2, illustrating the manner in which a slide is carried by a filing plate according to the present invention;

FIG. 4 is a diagrammatic illustration of an optical system, showing the manner in which the picture of a slide carried by the filing plate of the invention is projected;

FIG. 5 is an enlarged partial sectional view of a modified filing plate according to the present invention; and FIG. 6 is an enlarged partial sectional view of another modified filing plate according to the present invention.

Like parts are designated by like numerals and symbols throughout the different figures of the drawing.

DESCRIPTION OF THE PREFERRED EMBODIMENT

Figure 1:
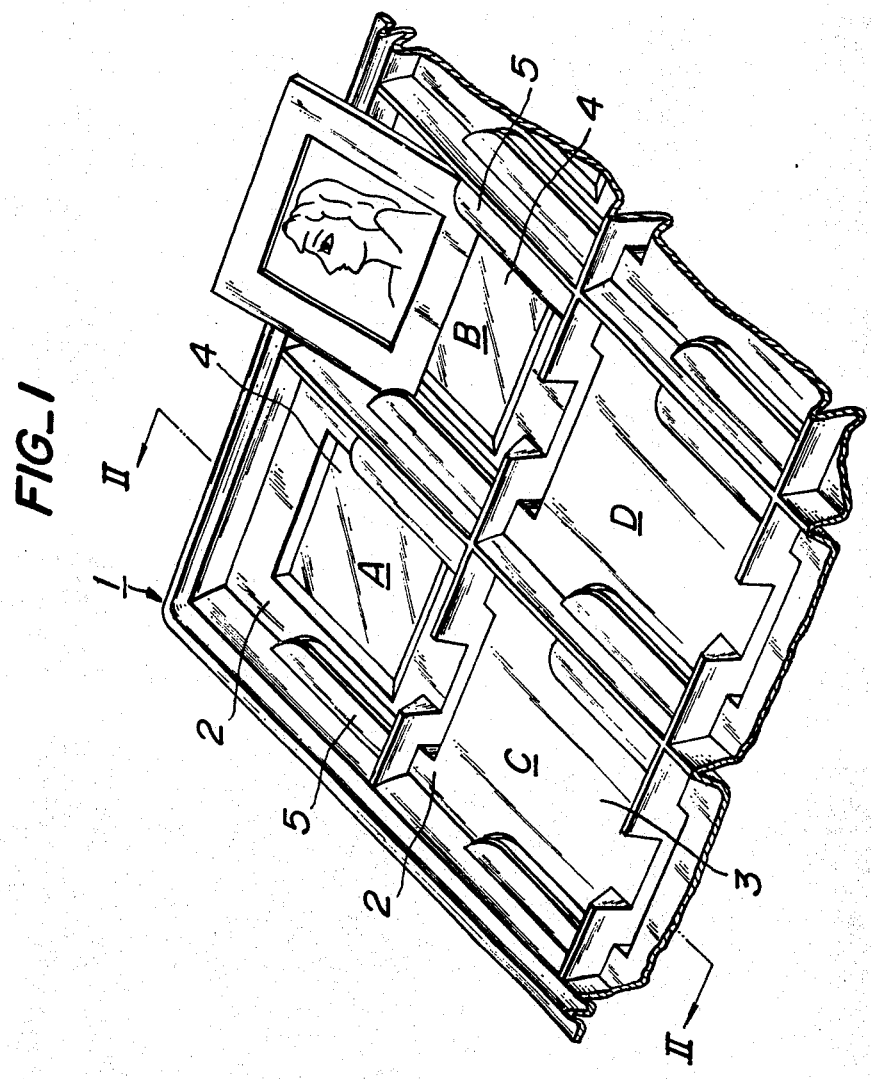
FIG. 1 is a schematic partial perspective view of a slide filing plate, illustrating the construction according to the present invention.

Referring to FIGS. 1 and 2, a slide filing plate 1 according to the present invention comprises a plurality of pockets or frames, for instance, as designated by the symbols A and B. In each slide filing plate, all the pockets have an identical structure. However, in order to facilitate the comparison of the structure of the invention with that of a conventional filing plate, conventional pockets C and D are illustrated along with the pockets A and B of the present invention. Thus, it should be noted here that, the hybrid construction, as shown in FIGS. 1 and 2, is merely for the sake of illustration, and it does not depict the overall construction of the present invention.

With a conventional slide filing plate, the slide-supporting surface 2 of a slide-receiving pocket is in the same plane with a diffusion plane 3 thereof, as shown in the pockets C and D of FIGS. 1 and 2. The diffusion plane 3 acts to protect the emulsion surface of a slide film held by the pocket C or D. If the slide on the diffusion plane 3 is directly projected by a suitable projector without removing the slide from the filing plate, the images of particles or veins on the diffusion plane are superposed on the image of the slide picture in an enlarged fashion. The particles may be dust particles, and the veins may be intrinsic veins formed in the membrane by the presence of heterogeneity of the material or mechanical scratches. The superposition of the enlarged images of such particles and veins deteriorates the grade of the projected image of the slide picture. To mitigate such difficulty, it has been proposed to form a vacant window on the pocket bottom wall at the back of the slide picture by eliminating the membrane. When the membrane is removed, the risk of damaging the emulsion surface of the slide film by direct mechanical contact with foreign matter is greatly increased, and the capability of simultaneously viewing the pictures of all the slides carried by the filing plate is substantially lost.

According to the present invention, a translucent or transparent membrane 4 is secured to each slide-receiving pocket A or B parallel to but spaced from a slide-supporting portion 2 of the pocket bottom wall, as shown in FIGS. 1, 2, and 3. More particularly, in the illustrated embodiment of the invention, the translucent or transparent membrane 4 forms a recessed portion of the pocket bottom wall. The non-recessed portion of the bottom wall forms the slide-supporting portion 2. Thus, the spacing from the slide film 6 to the translucent or transparent membrane 4 is greater than the spacing between the slide film 6 and the slide-supporting portion 2. It is important to choose the spacing from the slide film 6 to the translucent or transparent membrane 4 in a proper relation with the focal length of a projecting lens which is used for projecting the slides as placed on the filing plate 1 of the invention, so that a well focussed image of the slide picture may be formed on the screen while the images of particles and veins on the translucent or transparent membrane 4 are focussed at a position offset from the screen. Thereby, the projected image of the slide picture is well focussed on the screen, but images of the particles and veins on the membrane 4 are not formed on the screen, so that the superposition of the images of the slide picture and the particles and veins can be avoided.

The inventor has found that, in the case of a projecting lens with a focal length of 50 to 60 mm for projecting 35 mm slide films, the preferable spacing from the slide film 6 to the translucent or transparent membrane 4 is about 2 mm. It is apparent to those skilled in the art that, as the focal length of the projection lens increases, the preferable spacing between the slide film 6 and the translucent or transparent membrane 4 will also increase. Thus, it may be concluded that the slide filing plate according to the present invention is particularly suitable for a projector having a comparatively short focus projection lens.

The aforesaid relations among different parameters will now be described in further detail, by referring to FIG. 3. The slide filing plate 1 according to the present invention includes a pair of holding lugs 5 in each slide-receiving pocket, which lugs urge film mount members 7 (sandwiching edge portions of the slide film 6) against the slide-supporting portion 2 of the pocket. For instance, the mount members 7 are a pair of cardboard frames. In this case, there will be a spacing 8 between the slide film 6 and the slide-supporting portion 2, which spacing corresponds to the thickness of one sheet of the cardboard mount 7, that is normally less than about 1 mm.

Accordingly, with the conventional structure of the slide filing plate, the spacing between the slide film and the diffusion membrane is about 1 mm at most. On the other hand, with the present invention, in addition to the aforesaid spacing 8, a spacing 9 is provided between the slide-supporting surface 2 and the translucent or transparent membrane 4, so that the spacing from the slide film 6 to the translucent or transparent membrane 4 is considerably larger than the thickness of the individual mount member 7, preferably in excess of 3 mm.

Generally speaking, the overall thickness T of the slide filing plate 1, as shown in FIG. 3, varies depending on the material constituting the plate 1, and it can be about 7 mm in the case of a plastic filing plate. If the thickness of the mount 7 carrying the slide film 6 is about 1.5 to 2 mm, it is possible to provide a spacing of 3 to 4 mm between the slide film 6 and the translucent or transparent membrane 4.

The effect of the present invention will now be described in further detail, by referring to FIG. 4. A projection lens 10 acts to produce a focussed image of a picture of the slide film 6 on a screen 11. A condenser lens 12 directs the projecting light beam to the projecting lens 10 through the slide film 6. Let it be assumed that the image of a point P of the slide film 6 is focussed and projected on the screen 11 at the point P' through the projection lens 10. Then, the image of a particle at an intersection Q between the translucent or transparent membrane 4 and an optical axis through the center of the projection lens 10 and the point P is formed at a point Q' on the optical axis, which is offset from the screen 11, as shown in FIG. 4. The light beams through the particle at the point Q are diverged on the screen 11, as shown by point Q1 and Q2, so that no discernible image of the particle at the point Q is produced on the screen 11.

Therefore, only the image of the picture of the slide film 6 is projected on the screen 11, and images of the particles and veins on the membrane 4 are not projected on the screen 11. The inventor's tests indicate that the translucent or transparent membrane absorbs a certain amount of light energy, so that the brightness of the image on the screen is somewhat reduced, as compared with that without any such membrane 4. However, the inventor has found that, if a proper material is selected for the translucent or transparent membrane, the quality of the slide picture, as projected on the screen through the membrane 4, is good enough for general appreciation and general applications, such as information retrieval.

In the above described embodiment, the membrane 4 formed at the recessed portion of the slide supporting portion 2 has been made substantially flat in section. Alternatively, the membrane 4' may be convex in section as shown in FIG. 5. In this case, it is necessary to locate the top surface of the convex membrane 4' at a position which is below the slide supporting portion 2 by a distance D. The embodiment shown in FIG. 5 is capable of avoiding the difficulty of projecting the image of the particles and veins on the outer periphery of the membrane 4' on the screen 11, which has eventually been encountered with the embodiment shown in FIG. 4.

In FIG. 6 is shown a third embodiment in which the membrane 4" protudes at its center as a trapezoid in section. Also, in this case, the top surface of the protruded trapezoid 4" is below the slide supporting portion 2 by the distance D. The present embodiment can also avoid the difficulty of projecting the image of the particles and veins on the outer periphery of the membrance 4" on the screen 11.

As described in the foregoing, according to the present invention, there is provided a novel slide filing plate which simultaneously fulfills the protection of the emulsion surface of a slide film by a translucent or transparent membrane, easy viewing of all the slides carried by the filing plate through the diffused light beams, and projection of the slide pictures onto a screen by placing the slides in a suitable projector as placed on the filing plate, or without removing the slides from the filing plate.

The foregoing description refers to an embodiment of the invention, which is made by shaping a plastic material. It is apparent to those skilled in the art that the material for the slide filing plate according to the present invention is not restricted to plastic material alone. For instance, a slide filing plate may be formed by bonding suitably cut cardboard, the desired spacing between the slide film and the translucent or transparent membrane can be provided by selecting a proper thickness for the cardboard material, so as to construct the slide filing plate of the present invention.

What is claimed is:

1. A slide filing plate comprising a substantially planar body, a plurality of slide-receiving pockets formed in the body and receiving one slide in each pocket, said pockets having bottom walls disposed in a common plane and comprising slide-supporting portions, so as to dispose films of slides placed in the pockets in a common plane parallel to the plane of the bottoms of the pockets, and a plurality of membranes passing at least a part of incident light therethrough to a degree of not less than translucence, each of said membranes being formed as one piece with the bottom and bottom wall of a corresponding one of the pockets parallel to said common plane but with a spacing from the plane of the bottom wall, said membrane being formed as a recessed portion of said slide-supporting portion the spacing between the membrane and the film of the slide placed in the pocket being greater than the spacing between the slide-supporting portion of the pocket bottom wall and the last mentioned slide film to prevent the image of particles on the membrane from being projected on a screen.

2. A slide filing plate according to claim 1, wherein said membrane is substantially flat in section.

3. A slide filing plate according to claim 1, wherein said membrane protrudes substantially at the center of said recessed portion.

4. A slide filing plate according to claim 1, wherein said membrane is convex in section and has a top surface slightly below said slide-supporting portion to prevent the image of particles on the outer periphery of the membrane from being projected on a screen.

5. A slide filing plate according to claim 1, wherein said membrane is trapezoidal in section and has a top surface slightly lower than said slide-supporting portion to prevent the image of particles on the outer periphery of the membrane from being projected on a screen.

6. A slide filing plate according to claim 1 wherein said slide-supporting portion of the bottom wall of each pocket forms a rectangular frame, and said membrane is confined within the outline of the frame.

* * * * *